United States Patent [19]

Kubo

[11] Patent Number: 4,666,575
[45] Date of Patent: May 19, 1987

[54] METHOD OF RECOVERING GALLIUM FROM SCRAP CONTAINING GALLIUM

[75] Inventor: Shigeki Kubo, Niihama, Japan

[73] Assignee: Sumitomo Metal Mining Company Limited, Tokyo, Japan

[21] Appl. No.: 886,153

[22] Filed: Jul. 16, 1986

[30] Foreign Application Priority Data

Sep. 13, 1985 [JP] Japan ................................. 60-203120

[51] Int. Cl.$^4$ .............................................. C25C 1/00
[52] U.S. Cl. ..................................... 204/105 R; 75/62; 75/63; 210/180; 210/774; 423/87; 423/88; 423/126; 423/127; 423/136; 423/491; 423/495
[58] Field of Search ............. 423/126, 127, 136, 87–88, 423/491, 495; 75/62–63, 68 R, 69; 203/DIG. 11; 204/105 R, 130; 210/774, 180

[56] References Cited

U.S. PATENT DOCUMENTS 4,368,108  1/1983  Rubinshtein .................... 204/105 R
4,421,615 12/1983  Yamada et al. ................. 204/105 R

*Primary Examiner*—R. L. Andrews
*Attorney, Agent, or Firm*—Watson, Cole, Grindle & Watson

[57] ABSTRACT

Scrap containing gallium and arsenic is treated with chlorine gas to form a crude gallium and arsenic chloride mixture. Arsenic chloride and impurities having a lower boiling point than that of arsenic chloride are removed from the mixture by vaporization so that crude gallium chloride may be obtained. The crude gallium chloride is purified by distillation. The purified gallium chloride is electrolyzed to yield metallic gallium. If the scrap has a molar gallium/arsenic ratio exceeding 1, arsenic chloride or metallic arsenic or both are added to the scrap before it if treated with chlorine gas.

18 Claims, No Drawings

METHOD OF RECOVERING GALLIUM FROM SCRAP CONTAINING GALLIUM

BACKGROUND OF THE INVENTION

1. Field of the Invention

This invention relates to a method of recovering gallium from scrap containing gallium.

2. Description of the Prior Art

Gallium is used as a material for making a compound semiconductor such as GaP or GaAs, or as a flux when an epitaxial layer is formed on a semiconductor substrate. As a result, there is eventually formed scrap of a gallium compound or metallic gallium. It is very important to recover gallium from such scrap from the standpoint of effective use of the resources. There are known a number of methods for recovering gallium from scrap. One of them is described in the Japanese Patent Application laid open Under No. 101625/1982. It comprises the vacuum thermal decomposition of scrap containing gallium arsenide, its heating and cooling treatment, filtration of the molten material, treatment for forming an aqueous phase and refining by recrystallization. Another method is described in the Japanese Patent Application laid open under No. 213622/1984. It comprises decomposing an intermetallic gallium compound by oxidation, adjusting the pH of the resulting solution, contacting the solution with a chelate resin so that the resin may adsorb gallium from the solution, passing an aqueous alkali solution through the resin to form an eluate of gallium and subjecting the eluate to electrolysis. Both of these methods are, however, complicated. Moreover, neither of them can recover gallium of high purity easily.

SUMMARY OF THE INVENTION

It is an object of this invention to provide a method which can comparatively easily recover gallium of high purity from scrap containing gallium.

This object is attained by a method comprising treating scrap containing gallium and arsenic with chlorine gas to form a crude gallium and arsenic chloride mixture, removing arsenic chloride and impurities having a lower boiling point than that of arsenic chloride by evaporation from the chloride mixture, distilling the remaining crude gallium chloride to obtain gallium chloride of high purity and electrolyzing the gallium chloride of high purity to recover metallic gallium.

If scrap does not contain arsenic, arsenic chloride or metallic arsenic or both are added to the scrap and their mixture is treated with chlorine gas to form a crude chloride mixture.

DETAILED DESCRIPTION OF THE INVENTION

If scrap contains both gallium and arsenic, as in the form of GaAs crystals, it is easily possible to form a crude chloride mixture if the scrap is treated with chlorine gas directly. If the scrap is of metallic gallium and does not contain arsenic, however, the blowing of chlorine gas into the molten scrap forms GaCl, $GaCl_2$ and $GaCl_3$ one after another and when $GaCl_2$ turns to $GaCl_3$, the crystals of $GaCl_2$ are precipitated and block the nozzle through which chlorine gas is blown. Therefore, it is necessary to add $AsCl_3$ having a lower melting point to prevent the precipitation of $GaCl_2$. The blocking of the nozzle may be prevented if chlorine gas is blown against the surface of the $GaCl_2$ solution through a nozzle not immersed therein. This method, however, enables only a reaction of low efficiency and requires a long time for chlorination. It is possible to add metallic arsenic instead of $AsCl_3$, as it is chlorinated to form $AsCl_3$ and thereby produces the same results.

It is preferable to form as a result of such chlorination treatment a crude chloride mixture having a molar Ga/As ratio not exceeding 1. If the ratio exceeds 1, $GaCl_3$ undergoes crystallization when the chloride mixture is cooled to a temperature below 70° C. for transfer to the forthcoming step of distillation. The crystallization of $GaCl_3$ makes the transfer of the chloride mixture difficult and its transfer at a temperature of 70° C. or above is very dangerous, as $AsCl_3$ produces vapor. The chloride mixture having a molar Ga/As ratio not exceeding 1 can be transferred safely without causing any crystallization of $GaCl_3$ even at room temperature.

The molar ratio of gallium and arsenic in the chloride mixture can be adjusted if $AsCl_3$ or metallic arsenic or both are added to the scrap, whether it may be scrap containing both gallium and arsenic, or gallium alone. It is appropriate to add $AsCl_3$ or metallic arsenic or both in a molar ratio of 1 to 5 to gallium. The addition thereof in a larger amount is uneconomical, as it results in an increased consumption of chlorine and an increased production of chloride.

The chlorination is an exothermic reaction. Even if the blowing of chlorine gas is started at room temperature, no heating is required, as a gradually rising temperature promotes the reaction. If the scrap is in the form of lumps, it is advantageous to separate it from a liquid phase and blow chlorine gas against it directly. If the scrap is in the form of powder, it is better to place it in a liquid phase and blow chlorine gas into the liquid phase.

Then, $AsCl_3$ and impurities having a boiling point which is lower than that of $AsCl_3$ are removed by evaporation from the crude gallium and arsenic chloride mixture. The removal of $AsCl_3$ and those impurities by fractional distillation makes it possible to recover $AsCl_3$ at a comparatively high purity. A part of the $AsCl_3$ which has been recovered can be recycled for addition to the scrap to be chlorinated. Alternatively, it can be reduced with hydrogen to form metallic arsenic, or hydrolyzed to form arsenious acid. As the arsenic chloride and impurities have been removed, there now remains crude gallium chloride.

The remaining crude gallium chloride is refined by distillation and the refined product is collected. It is preferably distilled at a temperature of 180° C. to 210° C. If its distillation temperature is lower than 180° C., the distillate contains arsenic and other impurities. If it exceeds 210° C., the distillate contains impurities having a high boiling point and fails to provide gallium of high purity. A distillation temperature of 200° C. to 208° C. is particularly preferred. The distillation is preferably carried out so that the crude gallium chloride in a distillation still may not be distilled completely, but so that at least 10%, or preferably about 20%, thereof may be left undistilled, since a reduction in the amount of the chloride in the still results in a slower rate of distillation which is likely to produce a distillate having a higher content of impurities. The chloride remaining in the still can be recycled for use when another batch of crude $GaCl_3$ is distilled. The gallium chloride which has been purified by distillation is substantially free from impurities other than arsenic.

The purified gallium chloride is electrolyzed to yield metallic gallium of high purity. The purified gallium chloride still contains about 2% of arsenic, but when it is electrolyzed, the arsenic is removed therefrom substantially completely. The gallium chloride can be dissolved in water to form an acidic solution which can directly be electrolyzed to form metallic gallium. However, as the electrolysis of the acidic solution produces chlorine gas and has a low degree of current efficiency, it is preferable to form a gallate solution and electrolyze it. The gallate solution can be formed if an excess of an alkali, such as NaOH, is added to the aqueous solution of $GaCl_3$. When the gallate solution is prepared, gallium forms a slurry of $Ga(OH)_3$. If the slurry has too high a gallium concentration, it is impossible to stir it to dissolve $Ga(OH)_3$. Therefore, it is preferable for the slurry to have a gallium concentration of 40 to 100 grams per liter. The use of a slurry having a lower gallium concentration should be avoided, as it requires an unnecessarily large amount of electrolyte.

The electrolysis is preferably carried out at a cathode current density of the 2.5 to 10 $A/dm^2$. Any current density deviating from this range is not practical from the standpoint of current efficiency. For the electrolytic collection of gallium, it is appropriate to use a cathode formed from titanium and an anode formed from platinum or like material. As a result of electrolysis, metallic gallium is precipitated on the cathode. If the concentration of gallium in the electrolyte becomes too low, the rate of its precipitation becomes so low as to make the electrolytic operation inefficient. Therefore, the electrolysis should be discontinued when the concentration of gallium has decreased to a certain level. The gallium remaining in the electrolyte can be recovered by sedimentation in the form of $Ga(OH)_3$ if the electrolyte is first acidified and then neutralized. The gallium which has been recovered can be used for preparing another batch of electrolyte. As a result of electrolysis, it is possible to recover metallic gallium having a purity of 99.9999%.

The invention will now be described more specifically with reference to a number of examples.

EXAMPLE 1

A grating holding 600 g of lumps of scrap of a compound of gallium and arsenic containing 41.7% by weight of gallium and 58.0% by weight of arsenic and having a molar Ga/As ratio of 0.77 was placed in a separable flask having a volume of two liters and chlorine gas was blown into the flask at a rate of one liter per minute for five hours, whereby 1568 g of a crude gallium and arsenic chloride mixture were formed at the bottom of the flask. A flask still having a capacity of one liter was charged with 1565 g of the crude chloride mixture and heated by a mantle heater for carrying out distillation. First, $AsCl_3$ and impurities having a boiling point which was lower than that of $AsCl_3$ were removed from the chloride mixture. A vapor passageway was cooled by water and the distillate was collected in a receptacle. The distillation was discontinued when the vapor temperature had reached 180° C. Then, the receptacle was changed and while the vapor passageway was held at a temperature of 70° C. to 80° C., the distillation was continued until the vapor temperature reached 210° C. The distillation yielded 795.4 g of $AsCl_3$ and 508.3 g of $GaCl_3$ with a still residue of 261.3 g. The gallium chloride which had been collected had an arsenic content of 1.6%.

EXAMPLE 2

A flask having a volume of two liters was charged with 300 g of crude metallic gallium containing 99.0% by weight of gallium and 780 g of $AsCl_3$ The mixture thereof gave a molar Ga/As ratio of 1.0. Chlorine gas was blown into the liquid in the flask at a rate of one liter per minute for three hours, whereby 1535 g of a crude gallium and arsenic chloride mixture were formed. The method of EXAMPLE 1 was thereafter repeated, whereby 741 g of $AsCl_3$ and 719 g of $GaCl_3$ were obtained with a still residue of 75 g. The gallium chloride had an arsenic content of 2%.

EXAMPLE 3

465 g of the $GaCl_3$ which had been obtained in EXAMPLE 1 were dissolved in one liter of pure water. 300 ml of the solution which had been obtained was placed in a beaker having a volume of one liter. Pure water was added into the beaker to prepare one liter of a diluted solution having a gallium content of 46 g per liter for use as an electrolyte. A 90 mm square cathode and a substantially equally sized anode were suspended in the electrolyte. The cathode was a titanium plate and the anode was a net of titanium coated with Pt-Ru. Electrolysis was carried out for 24 hours at a cathode current density (DK) of 3.1 $A/dm^2$ and a bath temperature of 20° C., whereby 10.72 g of metallic gallium were collected. The gallium which had been recovered had a purity of 99.9999% by weight. TABLE 1 shows the impurities which it contained.

TABLE 1

| Impurities (ppm) | | | |
|---|---|---|---|
| Si | S | Mg | Fe |
| 0.08 | 0.10 | 0.04 | 0.05 |

Note:
Traces of O, C, N, P and Cl were also found, but no other substance was detected.

EXAMPLE 4

400 ml of the $GaCl_3$ solution which had been prepared in EXAMPLE 3 was placed in a beaker having a volume of two liters. Pure water was added into the beaker to form 1200 ml of a diluted solution. 183 g of high purity sodium hydroxide crystals were added into the solution and the solution was stirred to yield 1400 ml of a gallate solution having a gallium content of 52.8 g per liter for use as an electrolyte. One liter of the electrolyte was placed in a beaker having a volume of one liter. The electrolytic method of EXAMPLE 3 was repeated to recover 45.67 g of metallic gallium. A current efficiency of 87.8% was achieved. The gallium which had been recovered had a purity of 99.9999% by weight. TABLE 2 shows the impurities which it contained.

TABLE 2

| Impurities (ppm) | | | | | |
|---|---|---|---|---|---|
| Al | Si | S | Ca | Fe | Cu |
| 0.03 | 0.10 | 0.20 | 0.08 | 0.03 | 0.30 |

Note:
Traces of O, C, N, F and Cl were also found, but no other substance was detected.

What is claimed is:

1. A method of recovering gallium comprising:

treating scrap containing gallium and arsenic with chlorine gas to form a crude gallium and arsenic chloride mixture;

removing arsenic chloride and impurities having a lower boiling point than that of arsenic chloride by vaporization from said mixture to obtain crude gallium chloride;

distilling said crude gallium chloride to purify it; and electrolyzing said purified gallium chloride to recover metallic gallium therefrom.

2. A method as set forth in claim 1, further including adding to said scrap at least one substance selected from the group consisting of arsenic chloride and metallic arsenic so that said scrap may have a molar gallium/arsenic ratio not exceeding 1 before it is treated with chlorine gas.

3. A method as set forth in claim 2, wherein the impurities having a lower boiling point than that of said substance are removed by distillation so that arsenic chloride may be collected separately from said impurities.

4. A method as set forth in claim 1, wherein said crude gallium chloride is distilled at a temperature of 180° C. to 210° C.

5. A method as set forth in claim 4, wherein said crude gallium chloride is distilled at a temperature of 200° C. to 208° C.

6. A method as set forth in claim 1, wherein said distilling is discontinued when at least 10% by weight of said crude gallium chloride remains undistilled.

7. A method as set forth in claim 1, wherein a gallate solution is prepared from said purified gallium chloride for use as an electrolyte.

8. A method as set forth in claim 7, wherein said gallate solution has a gallium content of 40 to 100 g per liter.

9. A method as set forth in claim 1, wherein a cathode current density of 2.5 to 10 A/dm$^2$ is employed for said distilling.

10. A method of recovering gallium comprising:

adding at least one substance selected from the group consisting of arsenic chloride and metallic arsenic to scrap of metallic gallium;

treating said scrap with chlorine gas to form a crude gallium and arsenic chloride mixture;

removing arsenic chloride and impurities having a lower boiling point than that of arsenic chloride by vaporization from said mixture to obtain crude gallium chloride;

distilling said crude gallium chloride to purify it; and electrolyzing said purified gallium chloride to recover metallic gallium therefrom.

11. A method as set forth in claim 10, wherein said scrap to which said substance has been added has a molar gallium/arsenic ratio not exceeding 1.

12. A method as set forth in claim 10, wherein the impurities having a lower boiling point than that of said substance are removed by distillation so that arsenic chloride may be collected separately from said impurities.

13. A method as set forth in claim 10, wherein said crude gallium chloride is distilled at a temperature of 180° C. to 210° C.

14. A method as set forth in claim 13, wherein said crude gallium chloride is distilled at a temperature of 200° C. to 208° C.

15. A method as set forth in claim 10, wherein said distilling is discontinued when at least 10% by weight of said crude gallium chloride remains undistilled.

16. A method as set forth in claim 10, wherein a gallate solution is prepared from said purified gallium chloride for use as an electrolyte.

17. A method as set forth in claim 16, wherein said gallate solution has a gallium content of 40 to 100 g per liter.

18. A method as set forth in claim 10, wherein a cathode current density of 2.5 to 10 A/dm$^2$ is employed for said distilling.

* * * * *

REEXAMINATION CERTIFICATE (1213th)

United States Patent [19]

Kubo

[11] B1 4,666,575

[45] Certificate Issued Feb. 27, 1990

[54] METHOD OF RECOVERING GALLIUM FROM SCRAP CONTAINING GALLIUM

[75] Inventor: Shigeki Kubo, Niihama, Japan

[73] Assignee: Sumitomo Metal Mining Company, Tokyo, Japan

Reexamination Request:
No. 90/001,502, Apr. 26, 1988

Reexamination Certificate for:
Patent No.: 4,666,575
Issued: May 19, 1987
Appl. No.: 886,153
Filed: Jul. 16, 1986

[30] Foreign Application Priority Data

Sep. 13, 1985 [JP] Japan ................ 60-203120

[51] Int. Cl.$^4$ .................................... C25C 1/00
[52] U.S. Cl. .................................... 204/105 R; 75/62; 75/63; 210/180; 210/774; 423/87; 423/88; 423/126; 423/127; 423/136; 423/491; 423/495
[58] Field of Search .......... 423/126, 127, 136, 87–88, 423/491, 495; 73/62–63, 68 R, 69; 203/DIG. 11; 204/105 R, 130; 210/774, 180

[56] References Cited

U.S. PATENT DOCUMENTS

4,362,560  7/1982  Abrjutin et al.
4,368,108  1/1983  Rubinshtein et al.

OTHER PUBLICATIONS

Ivanova, R. V., *Electronic Engineering*, series 14, issue 2, pp. 113 (1970) (in Russian, translation into English and German provided).

Nisel'son, L. A. et al, "Liquid–Vapor Equilibria in the $AsCl_3$—$GaCl_3$—$PCl_3$ System", Russian J. Inorg. Chem. (English language ed) 15 (9):1284–1287 (1970).

*Primary Examiner*—John F. Niebling

[57] ABSTRACT

Scrap containing gallium and arsenic is treated with chlorine gas to form a crude gallium and arsenic chloride mixture. Arsenic chloride and impurities having a lower boiling point than that of arsenic chloride are removed from the mixture by vaporization so that crude gallium chloride may be obtained. The crude gallium chloride is purified by distillation. The purified gallium chloride is electrolyzed to yield metallic gallium. If the scrap has a molar gallium/arsenic ratio exceeding 1, arsenic chloride or metallic arsenic or both are added to the scrap before it if treated with chlorine gas.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 have been cancelled.

* * * * *